United States Patent [19]
Sohns et al.

[11] Patent Number: 5,900,592
[45] Date of Patent: May 4, 1999

[54] LOAD SENSING SYSTEM

[75] Inventors: Carl W. Sohns, Oak Ridge; Robert N. Nodine; Steven Allen Wallace, both of Knoxville, all of Tenn.

[73] Assignee: Lockheed Martin Energy Research Corp., Oak Ridge, Tenn.

[21] Appl. No.: 08/919,949

[22] Filed: Aug. 29, 1997

[51] Int. Cl.$^6$ ............................ G01G 3/14; G01G 23/18; H01G 5/00
[52] U.S. Cl. .................. 177/210 R; 177/45; 177/210 C; 177/210 FP; 73/862.68; 361/277
[58] Field of Search ........................... 177/210 R, 210 C, 177/210 FP, 212, 210 EM, 45; 73/862.68; 361/277, 280

[56] References Cited

U.S. PATENT DOCUMENTS

| | | |
|---|---|---|
| 2,316,915 | 4/1943 | Truman ................................ 73/862.68 |
| 2,525,587 | 10/1950 | Cahn .................................... 177/210 C |
| 3,680,650 | 8/1972 | Zimmerer ............................. 177/210 C |
| 4,294,321 | 10/1981 | Wittlinger et al. ............... 177/210 FP |
| 4,457,386 | 7/1984 | Schett et al. ............................ 177/212 |
| 4,856,603 | 8/1989 | Murakoso et al. .................. 177/210 C |
| 5,232,063 | 8/1993 | Stroller .............................. 177/210 FP |
| 5,254,992 | 10/1993 | Keen et al. .......................... 177/210 R |

*Primary Examiner*—Randy W. Gibson
*Attorney, Agent, or Firm*—Quarles & Brady

[57] ABSTRACT

A load sensing system inexpensively monitors the weight and temperature of stored nuclear material for long periods of time in widely variable environments. The system can include an electrostatic load cell that encodes weight and temperature into a digital signal which is sent to a remote monitor via a coaxial cable. The same cable is used to supply the load cell with power. When multiple load cells are used, vast inventories of stored nuclear material can be continuously monitored and inventoried of minimal cost.

19 Claims, 4 Drawing Sheets

LOAD SENSING SYSTEM

This invention was made with government support under contract DE-AC05-96OR22464, awarded by the United States Department of Energy to Lockheed Martin Energy Research Corporation, and the United States Government has certain rights in this invention.

FIELD OF THE INVENTION

The invention relates generally to load detecting and measuring equipment. More particularly, the invention is directed to a load sensor suited for remote monitoring of distant inventory or other loads.

BACKGROUND OF THE INVENTION

Remotely monitoring weight or force is typically accomplished with a conventional load cell that utilizes a strain gauge element mounted on some sort of bending beam. The strain gauge element is connected to a bridge circuit to monitor minute changes in resistance that occur as the mounting surface strains. This type of system can be relatively expensive and typically has an analog output which is susceptible to interference in remote applications. A less expensive load cell design approach is to monitor the electrical capacitance between two spring loaded parallel plates. With increased applied force or weight, the plates move closer together and the capacitance between the plates increases which can be electrically monitored.

One problem with this capacitive approach is that the dielectric constant of the air between the plates changes as humidity and temperature change. The capacitance changes resulting from a changing dielectric constant between the plates cannot be distinguished from capacitance changes resulting from plate movement. Sealing the area between the plates and back-filling with a stable, inert gas is prohibitively expensive and negates the advantage of the capacitive approach.

SUMMARY OF THE INVENTION

It is accordingly an object of the invention to provide a load sensing system that is less expensive than a strain gauge type load cell and is not susceptible to atmospheric changes that affect simple capacitive detectors.

It is another object of the invention to provide a load sensing system utilizing load bearing plates that are more rugged than strain gauge elements and can be used in very harsh environments.

It is still another object of the invention to provide a load sensing system having increased sensitivity with increased load, resulting in improved resolution at full load while maintaining large dynamic range.

It is yet another object of the invention to provide a load sensing system that combines weight and temperature information in a simple time domain format and sends the information to a remote monitoring location on the same coaxial cable that powers the system.

It is further object of the invention to provide a load sensing system that is modular in construction to permit easy modification or customization for particular applications.

These and other objects of the invention are achieved by a load sensing system having a sensor interposed between a base and a load bearing platform for producing a signal representative of the distance between the base and the platform, and thus the load causing this distance. The load bearing platform has a first conductive surface, and a position sensor mounted on the base provides a second conductive surface. A preferably ramping voltage applied between the first conductive surface and the second conductive surface develops a ramping electric field between the first and second conductive surfaces, and a sensor plate positioned between the conductive surfaces detects the electrical field strength as the first and second conductive surfaces move toward and away from one another as a function of applied load. A processor is used to convert the sensor voltage and output load value information, such as on a display or through a printer.

The invention can be embodied in an electrostatic load cell in which a voltage ramp is applied between two spring loaded parallel plates having conductive surfaces, producing a uniform ramping electric field between the surfaces of the plates. As the weight or other load applied to the plates increases, the plates move closer together and the relative electric field intensity increases. The sensor plate, which is preferably a circular disc, is placed in the electric field and monitors the electric field strength in the gap which correlates to the distance between the plates. Simple circuitry can be used to convert the field strength to a weight dependent pulse width for efficient, low noise communication with a remote monitor. Changes in atmospheric properties do not affect the electric field strength between the plates, so system performance is unaffected by the environment. In addition to monitoring weight, temperature sensitive circuitry in the load cell can be used to vary the time between weight dependant pulses so that the output signal contains both weight and temperature information in a time domain format. The output signal can be decoded at a remote location where it is displayed or logged as necessary.

BRIEF DESCRIPTION OF THE DRAWINGS

An understanding of specific embodiments for the invention can be gained from a reading of the following detailed description and review of the accompanying drawing, in which.

DETAILED DESCRIPTION OF EMBODIMENTS OF THE INVENTION

The invention is directed to a reliable, rugged load sensing system that produces signals representative of load applied to a load bearing platform, independent of ambient temperature, humidity and pressure conditions, using a relatively inexpensive electrostatic sensor construction. The embodiments of the invention can be adapted for a number of applications involving the sensing of force or pressure applied to a platform surface, or changes in such force or pressure. The weight of objects placed on a platform can be determined, and changes in weight can also be monitored. Similarly, a dramatic change in weight, evidencing, for example, removal of an object, can be detected for security and inventory management purposes. The load can include fluid pressures and other environmental forces that may signal alarms when reaching critical levels in industrial processes. Preferred embodiments of the invention are described herein with reference to remote weight and temperature monitoring of special nuclear material inventory, but it should be appreciated that many other implementations, such as those outlined above, of the invention are possible.

Figure 1:
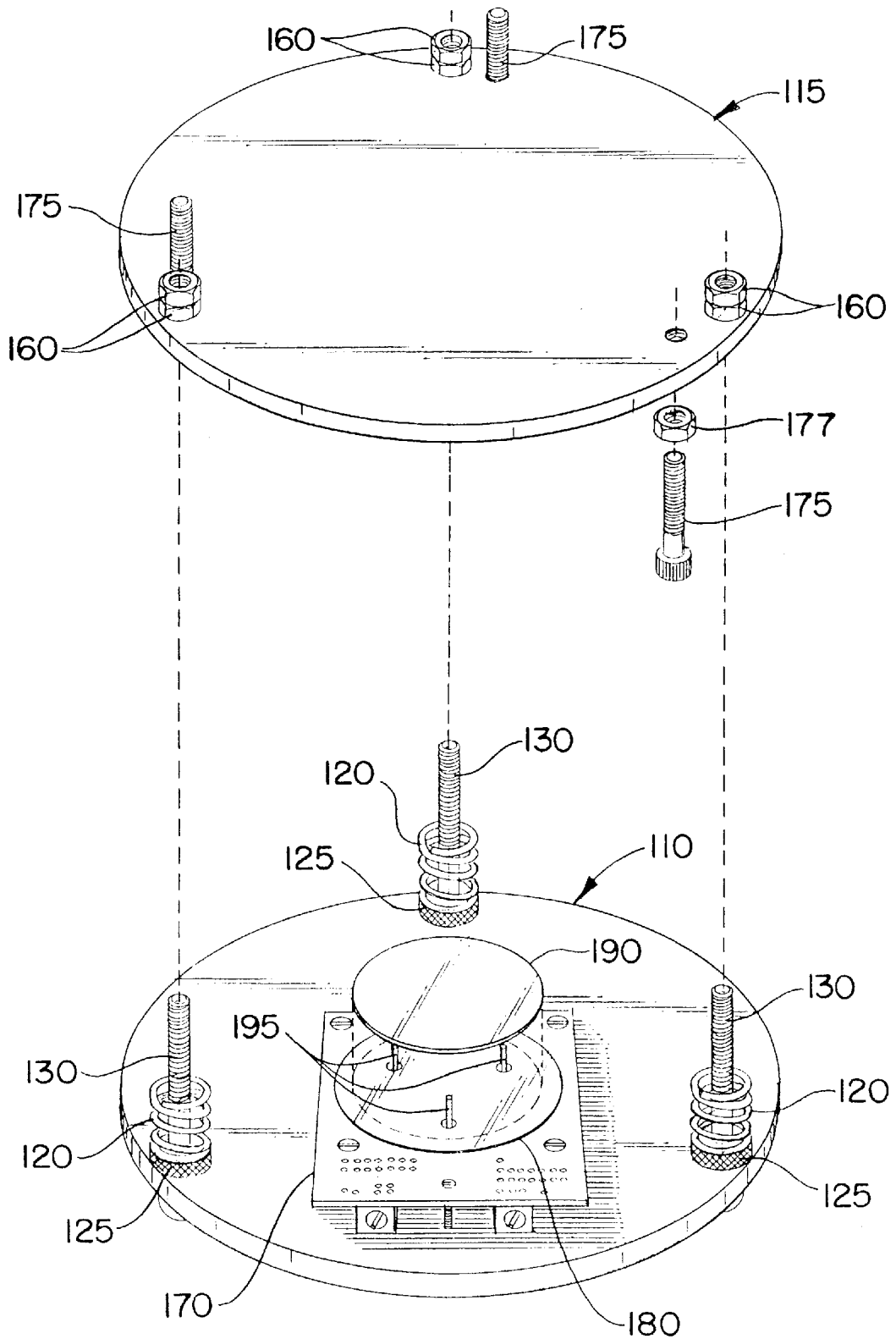
FIG. 1 is an exploded assembly view of an embodiment of the invention adapted for remote weight and temperature monitoring.

Referring to FIG. 1, an electrostatic load cell embodying the invention can include two, preferably round, 8 inch diameter stainless steel plates 110 and 115 separated by three springs 120. The plate 110 serves as a base providing structural support and an electrical grounding path for the system, while the plate 115 provides a load bearing platform for the system. The base can alternatively be provided by other support structure or framing, or by direct mounting to the ground for permanent installations.

The load bearing platform can be constructed in a variety of ways to accommodate different types of loads. While a planar platform is preferred to serve as a level surface for objects, other configurations, such as a bowl geometry for liquids, are possible. In any embodiment, the base and the load bearing platform must each provide or support a conductive surface facing the other preferably in parallel and evenly spaced fashion to produce an electric field therebetween when voltage is applied.

Three screws 130 can be placed through the plates 110 and 115 and the springs 120 in a manner that limits the maximum separation between the plates 110 and 115, thus holding the unit together. The screws 130 can be threaded through tapped holes in the bottom plate 110 and protrude through clearance holes in the top plate 115. Jam nuts 160 can be threaded onto the screws 130 protruding through the top plate 115 and act as a pre-load adjustment system that is useful for pre-stressing the main springs 120.

The bottom of the springs 120 are preferably centered on shoulder nuts 125 that permit compensation for spring length variations. The top of the springs 120 are preferably centered in countersunk clearance holes milled into the bottom side of the top plate 115. All three main springs 120 are preferably mounted in an identical manner so that the top plate 115 rides on the springs 120 alone when weight is added to the load cell. This construction minimizes friction between the top plate 115 and bottom plate 110 which allows for high resolution weight measurements with minimal hysteresis. The main springs 120 are preferably ground-end springs to reduce frictional resistance at their interfaces with the plates 110, 115.

Three additional "stop screws" 175 can be placed through tapped holes in the top plate 115. The stop screws 175 can be locked in place with jam nuts 177 located underneath the top plate 115. When properly adjusted, the stop screws 175 transfer excessive force or weight to the bottom plate 110 during an over load condition, thus protecting the circuit board 170. As a secondary function, the stop screws 175 can protrude up through the top plate 115 and act as guide pins for an object to be weighed.

In the case of a spring 120 failure, the stop screw 175 nearest the failed spring engages the lower plate 110 while the remaining two springs 120 remain active. In this failure mode, the electrostatic load cell can continue to respond to load changes, thus accomplishing uncalibrated inventory.

A circuit board 170 located between the two main plates 110 and 115 is preferably rigidly mounted to the bottom plate 110 so that the top of the circuit board 170 is spaced 0.150 inches from the bottom side of the top plate 115. A 3 inch diameter conductive pad 180 serving as a base conductive surface can be etched on the top of the circuit board 170 and forms a parallel conductor to the top plate 115. A conductive sensor, such as a preferably round disc 190, is rigidly mounted to the circuit board on three wire legs 195 forming a 0.050 inch gap between the circuit board 170 and the sensor disc 190. The wire legs 195 are insulated from the circuit board conductive pad 180 so that the sensor disc 190 acts as an independent voltage sensor in the gap between the circuit board 170 and the top plate 115.

The areas of the conductive surfaces of the load platform and a base should be larger than the area of the sensor to reduce or avoid "fringing" of the electric field sensed by the sensor. The plates 110, 115 are preferably at least 20% larger in diameter than the sensor disc 190. Other geometries are possible, but a circular construction is preferred, also to minimize fringing.

Figure 2:
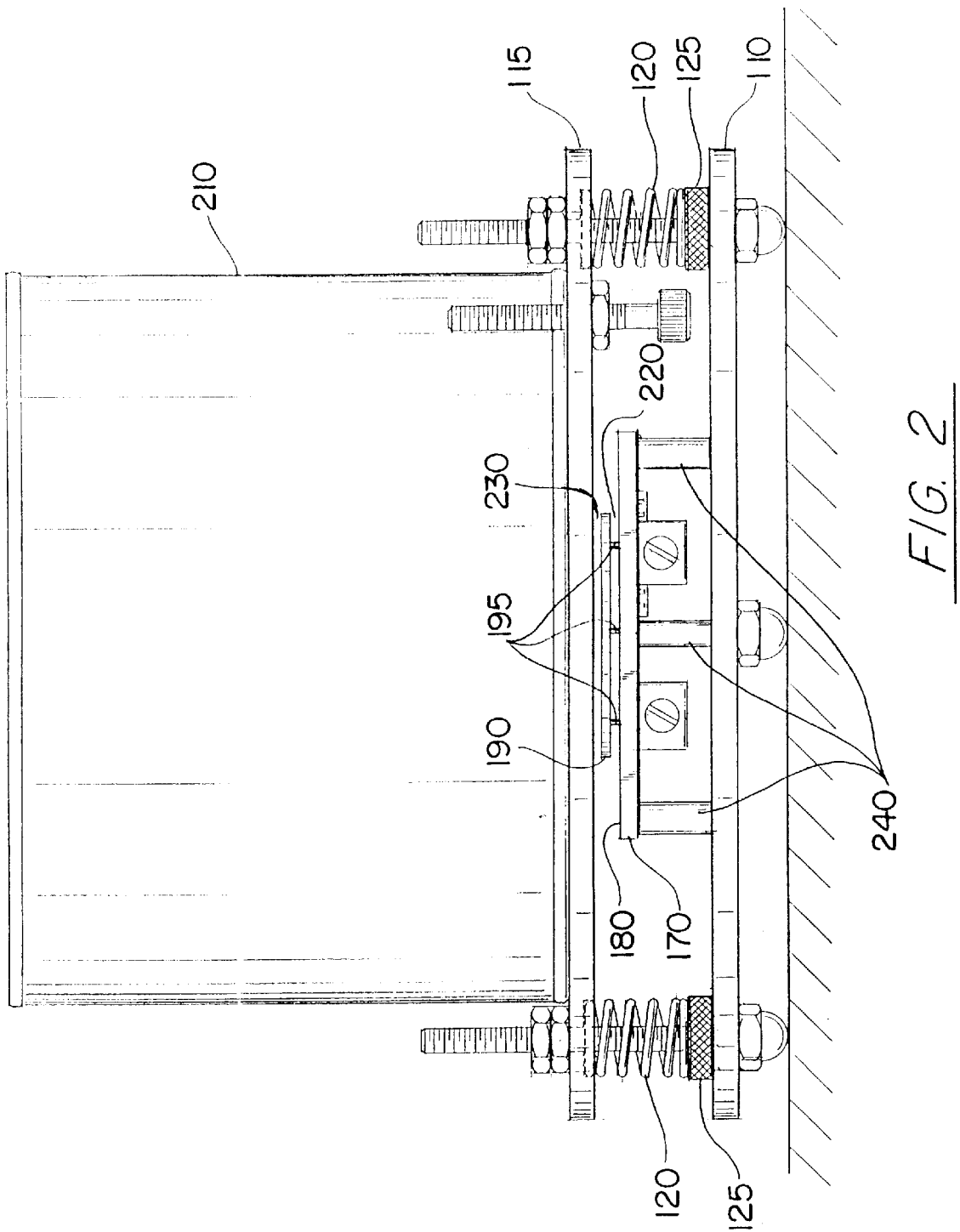
FIG. 2 is a side elevational view thereof.

Referring to FIG. 2, the top plate 115 moves closer to the circuit board 170 as the applied load such as a container 210 compresses the springs 120. The top plate 115 is preferably connected to circuit ground through the three main springs 120, the base plate 110, and the circuit board mounting posts 240. Other ground paths are possible. Circuitry on the board 170 develops a periodic ramp voltage which is applied to the conductive pad 180 producing a uniform ramping electric field between the conductive pad 180 and the top plate 115. The sensor disc 190, which is rigidly mounted above the conductive pad 180 by legs 195, forms a fixed gap 220. A second gap 230 that varies with load, such as the weight of the container 210, is formed between the sensor disc 190 and the top plate 115.

As the container 210 is added to the load cell, the main springs 120 compress, allowing the top plate 115 to move closer to the sensor disc 190 and base conductive pad 180 on the circuit board assembly 170. The distance of gap 220 between the conductive pad 180 and the sensor disc 190 is fixed while the distance of the second gap 230 between the sensor disc 190 and the top plate 115 varies with the applied weight 210. This arrangement produces an electrostatic voltage divider that divides the previously described voltage ramp in a ratio dependant on dimensions of the gaps 220, 230. Generally, the voltage ramp generated at the sensor disc 190 is proportional to the voltage ramp applied at the conductive pad 180 divided by the ratio of the gap distance 230 over the total distance of gaps 220 and 230.

Figure 3:
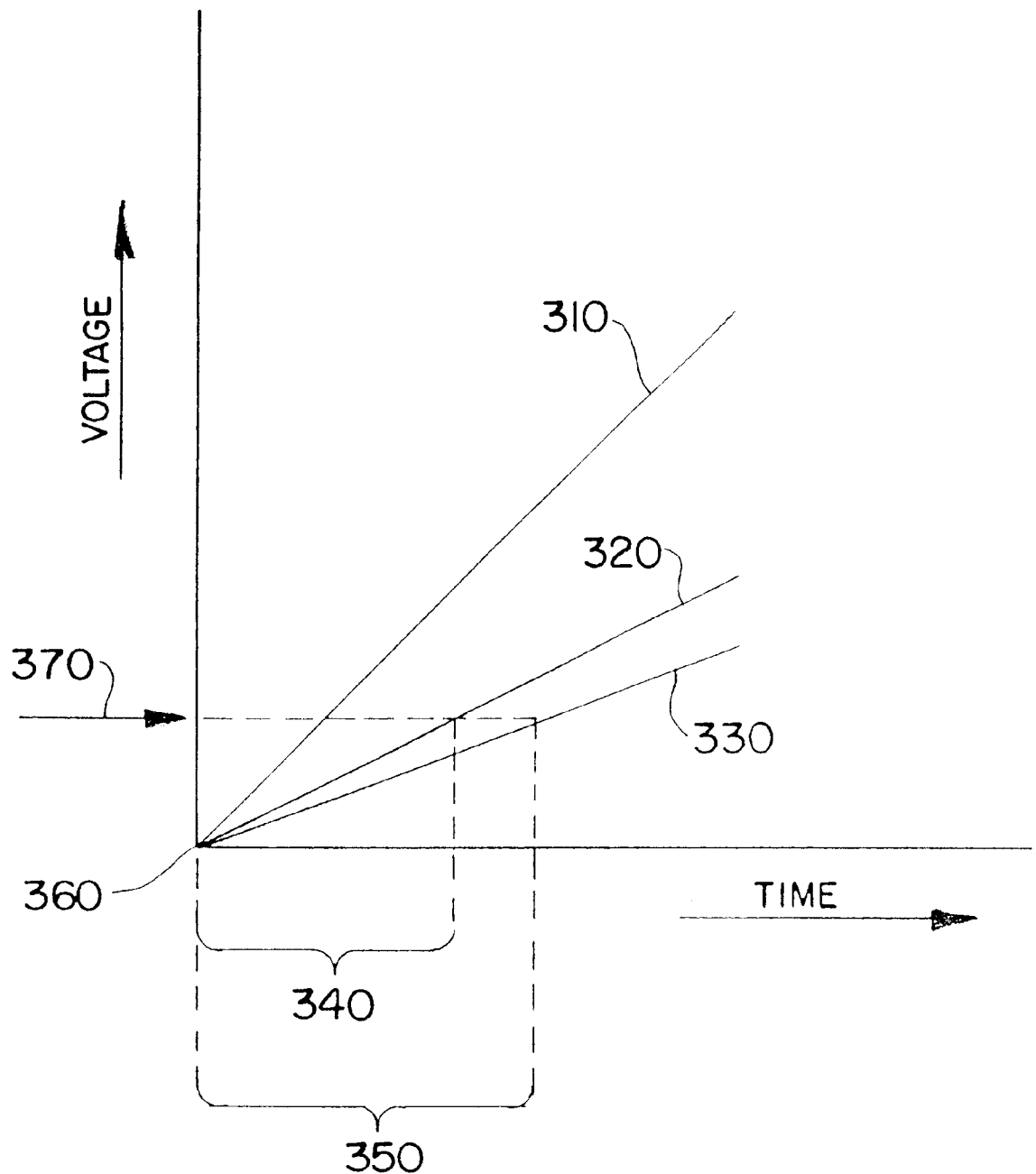
FIG. 3 is a time domain signal graph, illustrating the effect of changing sensor ramp voltage on a pulse signal representing load information.

Referring to FIGS. 2 and 3 together, the circuit preferably supplies a ramp voltage 310 to the conductive pad 180, thereby establishing a proportional ramp voltage 320 or 330 on the sensor disc 190 as a function of the spacing between the sensor disc 190 and the load platform 115. While a ramp voltage is preferred, other time varying voltage signals could be used. The output signal containing weight information produced by the system is preferably a pulse width 340 or 350 that starts when the voltage ramp begins 360 and ends when the sensor voltage reaches a predetermined trigger level 370.

As weight 210 is added to the load cell, the grounded top plate 115 moves closer to the sensor disc 190, and the voltage ramp on the sensor disc 190 has a lower slope because the electric field sensed by the sensor disc 190 is lower. With increasing load, more time is required for the sensor voltage 330 to reach the predetermined trigger level 370, and a longer output pulse width 350 results. The length of the output pulse 340, 350 is therefore dependant on the weight 210 applied to the load cell.

Figure 4:
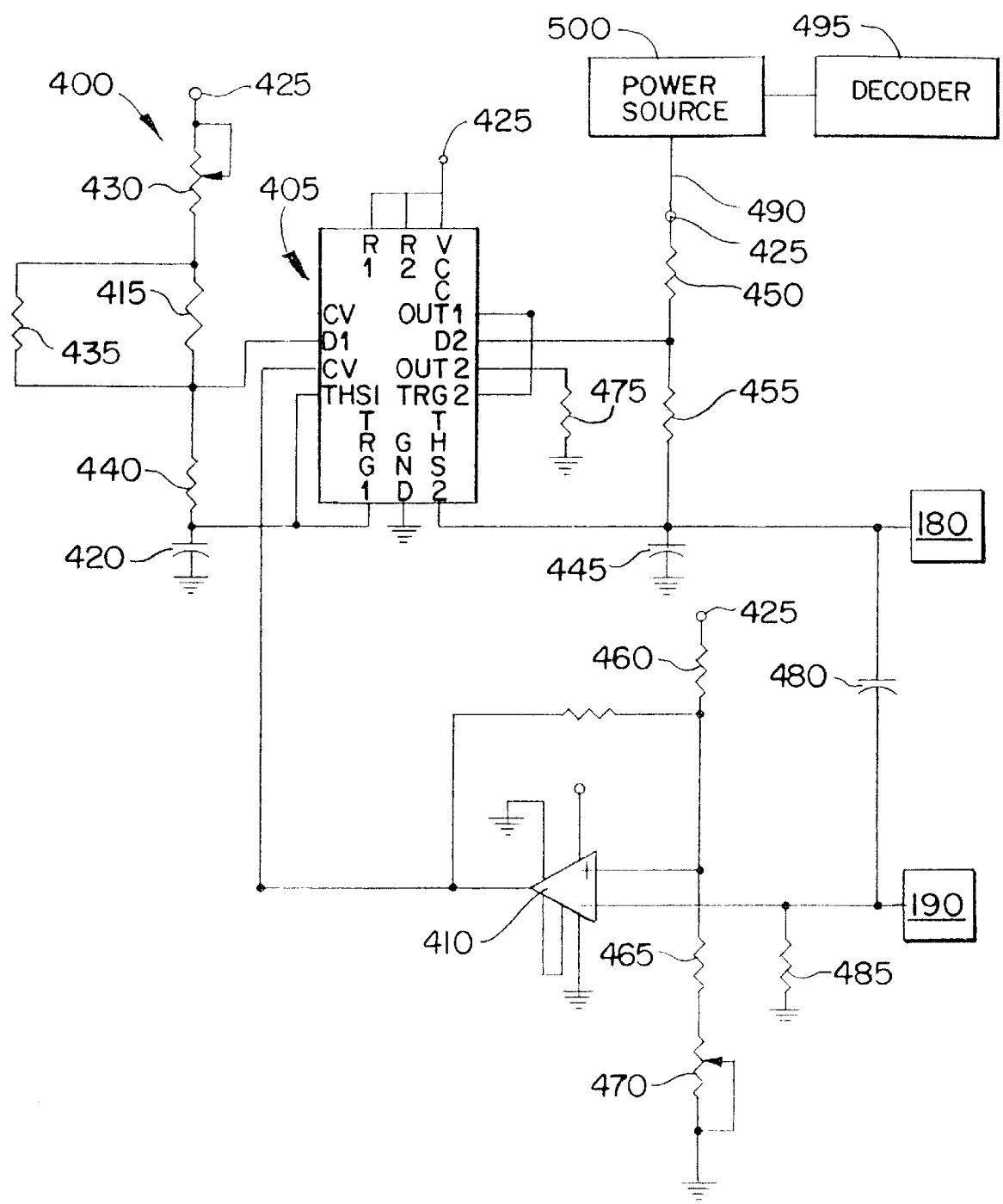
FIG. 4 is an electrical schematic for a circuit board used in the embodiment of FIGS. 1 and 2.

Referring to FIG. 4, the load cell processor preferably includes a ramp voltage source connected to the base conductive pad. The load cell circuitry can further include means for comparing the voltage ramp signal 320, 330 from the sensor disc to a reference voltage 370 (FIG. 3). The processor can also be constructed to incorporate ambient temperature information into the output signal. The voltage ramp generator can be triggered, for example, by an astable multivibrator with a temperature dependant output frequency, such as by a thermistor that produces a linear relationship between temperature and the time between weight pulses. The resulting output signal thus contains weight dependant output pulse widths, separated by a temperature dependant time.

In a preferred embodiment, a circuit 400 applies a ramping voltage to one of two conductive surfaces, such as the pad 180, in the electrostatic voltage divider and monitors the voltage ramp on the sensor disc 190 that results from the relative positions of the two conductive surfaces and the sensor disc. Based on the ratio of gaps 220 and 230 (FIG. 2), the circuit 400 produces a unique pulse width that manifests itself as an increase in current drawn by the circuit for the duration of the pulse width. The increase in current can be detected remotely so that additional signal wires from the circuit are not necessary to monitor the pulse width produced by the circuit 400. A further preferred function of the circuit 400 is to issue a continuous series of pulses as described above at a frequency that is dependent on the ambient temperature surrounding the circuit 400. The resulting composite signal thus contains information on the gap (i.e. weight) and the temperature of the electrostatic load cell.

The circuit 400, preferably includes a dual timer 405, such as a National Semiconductor LM556, a voltage comparator 410, such as a National Semiconductor LM311, and a thermistor 415.

One "half" of the dual timer 405 is used as a temperature dependent clock or time base. This operation is accomplished by connecting THS1 to TRG1 in the dual timer 405 so that the timer will trigger itself continuously. Specifically, capacitor 420 can be alternately charged from a voltage source 425 through resistors 430, 435, 415, and 440 and discharged through resistor 440 via D1 on the dual timer 405. The parallel combination of the resistor 435 and the thermistor 415 produces a temperature dependent charge path with better linearity than a thermistor alone. As the voltage on capacitor 420 rises to ⅔ the reference voltage 425, the timer "resets" and discharges the capacitor 420 through the resistor 440. The resistor 440 is preferably three orders of magnitude smaller than the resistors 430, 435 and 415 so that capacitor 420 discharges very rapidly and a short pulse is developed at OUT1 on the dual timer 405. When the voltage on capacitor 420 drops to ⅓ the reference voltage 425, the dual timer 405 is again "set" to charge the capacitor 420 through the resistors 430, 435, 415, and 440. This process continues indefinitely and short "trigger" pulses are produced at a frequency that is dependent on the temperature of the thermistor 415.

The short temperature dependent "trigger" pulses are then connected to the second timer of the dual timer 405 which is configured to operate in the monostable mode; that is, the second timer starts a cycle only when triggered by the first timer via OUT1 connected to TRG2 on the dual timer 405. As the second timer begins a cycle, capacitor 445 is allowed to charge through the resistors 450 and 455. The voltage across the capacitor 445 is a ramping voltage that is applied to the base conductive pad 180 discussed earlier, thereby developing a ramping electric field between the first and second conductive surfaces. The sensor disc 190 monitors the electric field strength in the gap between the first and second conductive surface and applies the divided voltage to the negative input of the voltage comparator 410. There, it is compared to a reference voltage on the positive input of the comparator 410, developed by a voltage divider comprised of resistors 460, 465 and 470. When the voltage from the sensor disc 190 reaches the reference voltage on the positive input to the voltage comparator 410, the output of the voltage comparator 410, goes to a low level which pulls the voltage on the control voltage input (CV) to the second timer on the dual timer 405 to a low level. As the CV input on the dual timer 405 is pulled low, the second timer is "reset" and the capacitor 445 is discharged through resistor 455 via D2 on the dual timer 405. During the time that the capacitor 445 is being charged, the output of the second timer OUT2 is "high" or equal to the reference voltage 425, causing current to flow through a resistor 475 to ground. This current must be supplied from the remote power supply and can be detected at the power supply. As described earlier, the spacing between the output pulses is temperature dependent and indicates the temperature of the electrostatic load cell.

Additionally, the connection between the capacitor 445 and the THS2 input on the dual timer 405 allows the second timer to reset itself when the voltage on the capacitor 445 reaches ⅔ the reference voltage 425 regardless of the voltage on the sensor disc 190 and the voltage comparator 410. This limits the length of the output pulse when the first conductive surface in the electrostatic voltage divider is too close to the sensor disc, a condition caused by excessive weight on the load cell.

A capacitor 480 is preferably selected to be of similar capacitance to the input capacitance of the voltage comparator 410 and reduces the current needed from the sensor disc 190 to charge input of the comparator 410. This arrangement reduces loading on the sensor disc 190 and produces increased system stability. A resistor 485 with a very high value of resistance can be used to provide a leakage path for static charge on the sensor disc 190 to return to ground.

While load and temperature information reporting at the load cell itself is possible, the system is preferably arranged to communicate the information remotely. This remote monitoring capability is particularly advantageous for monitoring loads in environments that are dangerous or under high traffic, or where central monitoring of multiple locations is required.

In a preferred arrangement, remote communication of the load and temperature information can be performed by monitoring the current required by the load cell. Again in FIG. 4, power to the load cell is preferably provided through a single coaxial cable 490. As the load cell circuit generates output pulses, the load resistor 475 can be used to increase the total current demand of the load cell during the output pulse described earlier. The increased current demand is supplied through the power cable and is detected remotely by a separate decoder 495 located near the power supply 500. The output pulses from the load cell are therefore reconstructed remotely without the need for additional signal cables or sophisticated transmitting equipment. A computer (not shown) can measure the period and pulse width of the load cell output and translate the information back to weight and temperature.

According to another aspect of the invention, as the top plate 115 moves closer to the sensor disc 190, the ratio between the gaps 220 and 230 changes at an increasing rate, resulting in increased system sensitivity. This produces a desirable "reverse compression effect" so that the load cell has increased sensitivity while monitoring the full design load and less sensitivity while monitoring small loads. This feature allows for very large dynamic range while maintaining high resolution at full loads.

The described embodiments are intended only as enabling illustrations, and alternatives should now be apparent to the reader. For example, the electrostatic load cell described herein performs an automatic electronic inventory of stored nuclear material; however, it could easily be modified to monitor the inventories in large warehouses. In that application, the plates and springs of the load cell would be sized consistent with the items being stored while the electrostatic detector 170 could be used with little change.

Communication with a central control room would be simplified with the described single wire digital format. Such a warehouse monitoring capability would also be helpful in verifying that shipments were being made from proper bins and items were being resupplied to proper bins. Inventory control of pharmaceuticals is also possible with a modified version of the electrostatic load cell. Used in conjunction with a central pharmacy computer, movement of controlled substances could be monitored and logged as necessary. Security applications are also possible with this system. Separate items and entire shelves of items could be monitored with the system technology in areas where surrounding activity must continue. In this application, an alarm could be issued if the monitored item were moved.

The fixed and moveable relationship between the base, the load platform and the sensor plate can also be varied as needed. For example, the sensor could be fixed relative to a top plate rather than a base. The top plate could also be fixed while the base is permitted to move, or both could be moveable under certain load conditions, sending a reading of net load applied to the system.

Thus, the scope of the invention should not be limited to the details of the examples discussed, but rather should be determined from the appended claims.

What is claimed is:

1. A load sensing system, comprising:
   a load bearing platform providing a first conductive surface;
   a base providing a second conductive surface, said first and second conductive surfaces being relatively movable toward and away from one another as a function of a load applied to said load bearing platform;
   a sensor plate disposed between said first and second conductive surfaces and at a fixed distance from one of said first and second conductive surfaces, said system being subject to varying ambient conditions causing variation of a dielectric constant between said first and second conductive surfaces;
   a time-varying voltage generator connected between said first and second conductive surfaces for establishing an electric field between said first and second conductive surfaces;
   said sensor plate providing a signal representative of varying electrical field strength as said first and second conductive surfaces move toward and away from one another; and,
   a processor responsive to said signal from said sensor plate representative of varying electrical field strength between the first and second conductive surfaces, independently of said varying dielectric constant, for generating load value information.

2. The system of claim 1, wherein said processor determines a ratio of electrical field strength between said sensor and said first conductive surfaces and electrical field strength between said first and second conductive surfaces in accordance with said signal, said ratio being independent of said dielectric constant.

3. The system of claim 1, wherein said voltage generator successively applies a first set of time varying voltage signals across said first and second conductive surfaces, said sensor generating a second set of time varying voltage signals responsive to said first set of time varying voltage signals.

4. The system of claim 3, wherein said first and second surfaces are substantially flat.

5. The system of claim 3, further comprising posts for slidingly connecting the load bearing platform and the base, and springs mounted on the posts for urging the load bearing platform and the base apart.

6. The system of claim 3, wherein the base is stationary and the load bearing platform moves as a function of applied load.

7. The system of claim 3, wherein the sensor is fixed relative to the first conductive surface.

8. The system of claim 3, wherein each time varying voltage signal of said first set and said second set includes a ramp voltage component.

9. The system of claim 4, wherein said processor comprises means for comparing each of said voltage ramp components of said second set to a reference voltage, a time duration required for each of said voltage ramp components of said second set to attain a level of said reference voltage representing a datum of said load value information.

10. The system of claim 5, wherein said processor comprises an output pulse signal generator, having successive pulse widths, said widths corresponding to a value of the applied load.

11. The system of claim 6, further comprising a power supply and a detector for sensing current variations from the power supply, wherein said processor is coupled to the power supply, said processor being arranged to draw current as function of said series of pulses, whereby the load value information can be obtained from the current variations.

12. The system of claim 6, further comprising a temperature sensor for said varying ambient conditions, said processor varying time intervals between said pulses of said output signal responsive to said temperature sensor.

13. The system of claim 1, further comprising a temperature sensor for generating a signal representing a temperature of said varying ambient conditions, said processor also being responsive to said temperature sensor.

14. The load sensing system of claim 1, wherein the processor includes at least one of the group of: a display for the load value information; a device for storing the load value information; a printer for printing the load value information; and an alarm for signaling when the load value information meets a predetermined alarm value.

15. The system of claim 1, wherein said first and second conductive surfaces are everywhere substantially equally spaced from one another.

16. The system of claim 1, wherein said sensor comprises a third conductive surface, said third conductive surface being everywhere substantially equally spaced from each of said first and second conductive surfaces.

17. A load sensing system, comprising:
   a base plate;
   a plurality of posts extending upwardly from said base plate;
   a plurality of compression springs, each spring mounted around one of said posts;

a top plate for supporting an object to be weighed, said top plate having a plurality of holes for receiving said posts, said top plate being movably suspended above said base plate by said compression springs;

a circuit board mounted on said base plate, said circuit board providing:

a conductive pad spaced substantially parallel to said top plate;

a voltage generator for supplying a ramp voltage relative to ground to said conductive pad;

a conductive sensor disc spaced between the conductive pad and the top plate and providing a sensor voltage, said sensor voltage being a function of the spacings of the sensor disc from the conductive pad and the top plate and of the ramp voltage;

an electrical pulse generator for producing pulses of variable duration, the duration of each pulse ending when the sensor voltage reaches a predetermined trigger voltage; and a processor for converting the pulses into weight information.

18. A load sensing system, comprising:

a load sensor for detecting load and producing a first signal representative of said load;

an ambient condition sensor for detecting a parameter of ambient conditions surrounding the load sensor and producing a second signal representative of said parameter; and a processor for producing a series of pulses responsive to said first and second signals, said series of pulses having pulse widths and frequency corresponding to the values of said first and second signals.

19. The load sensing system of claim 18, wherein the parameter is temperature, said pulse frequency corresponding to temperature and said pulse widths corresponding to load.

* * * * *